INVENTOR
ALBERT L. SEMON
BY John A. Seifert
ATTORNEY

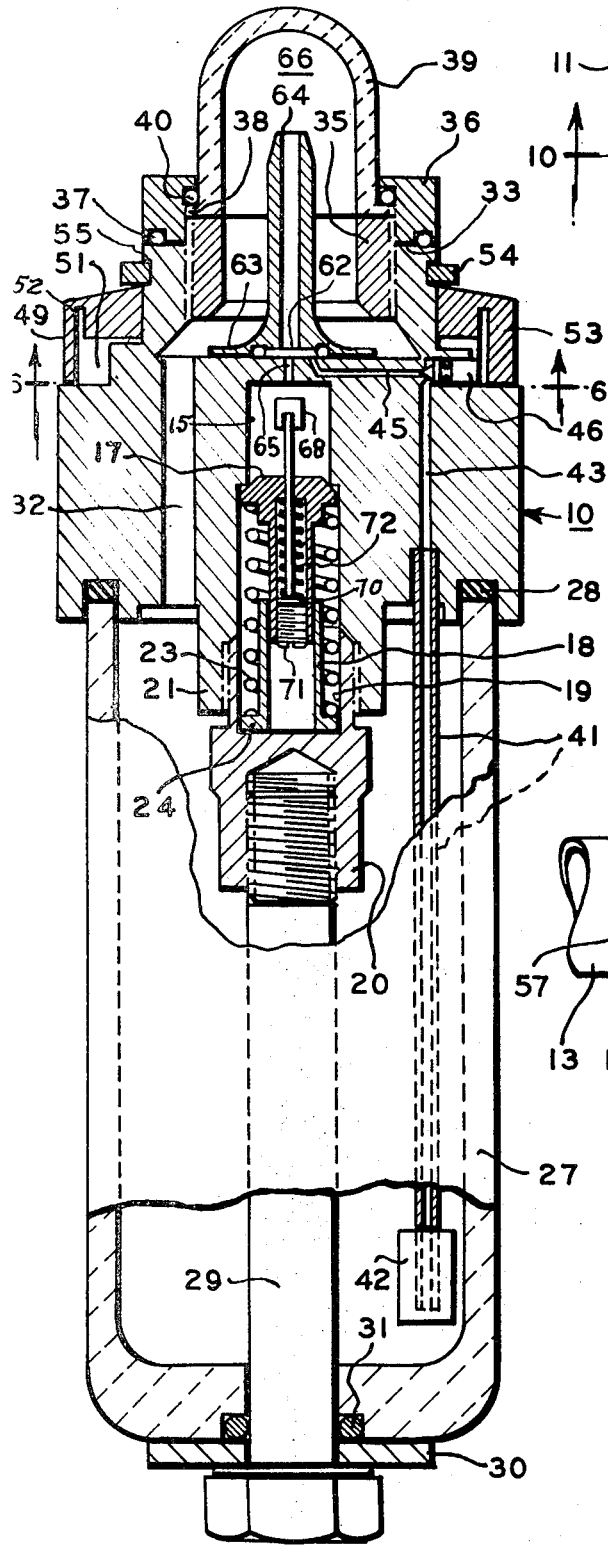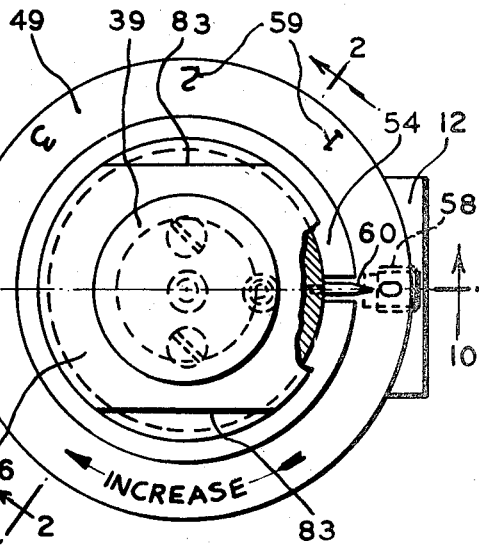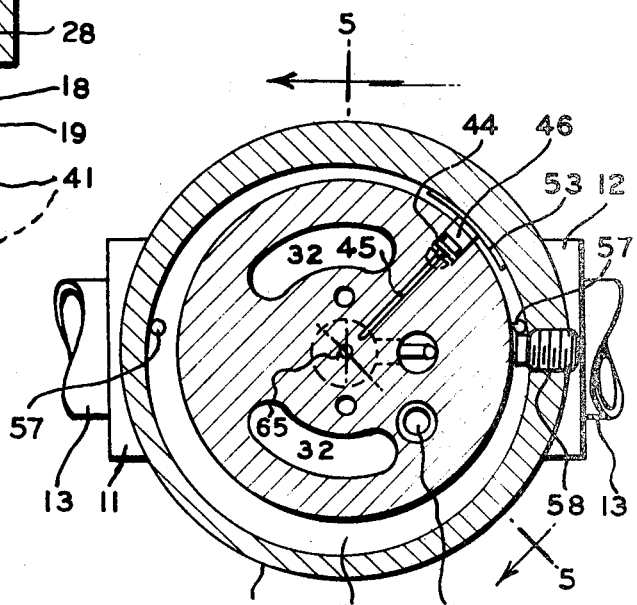

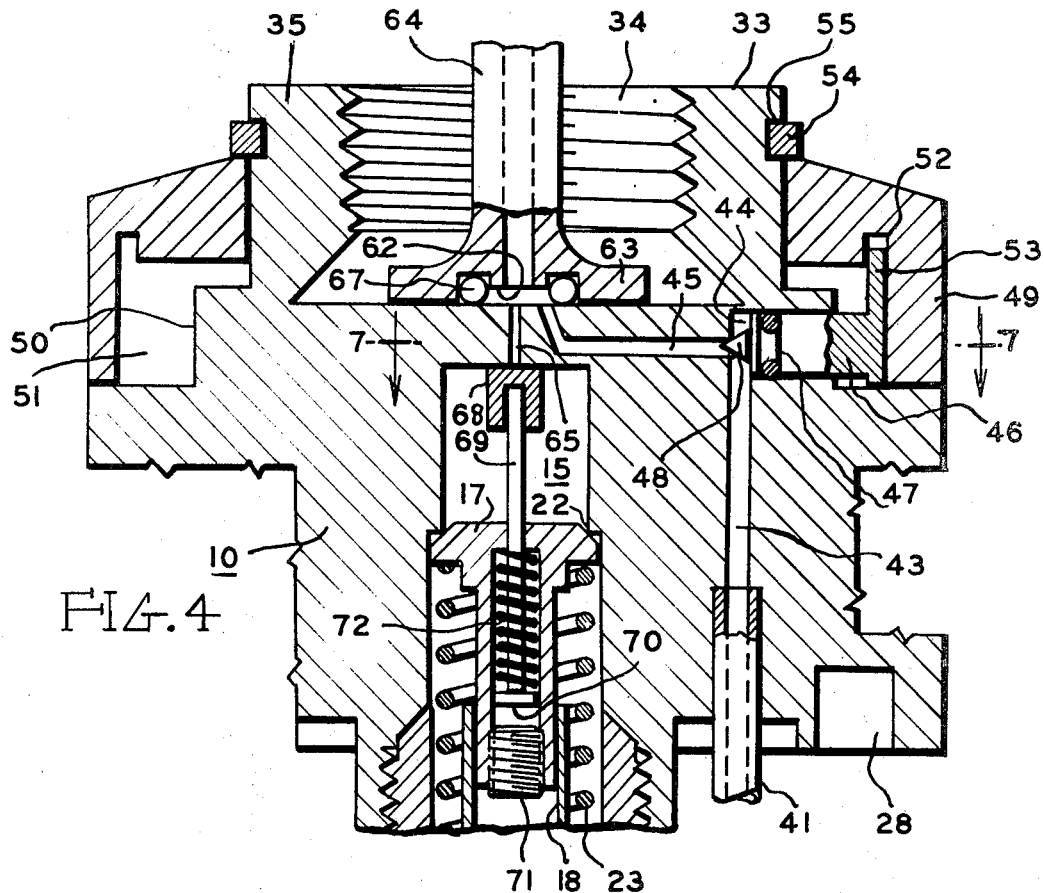
FIG.4
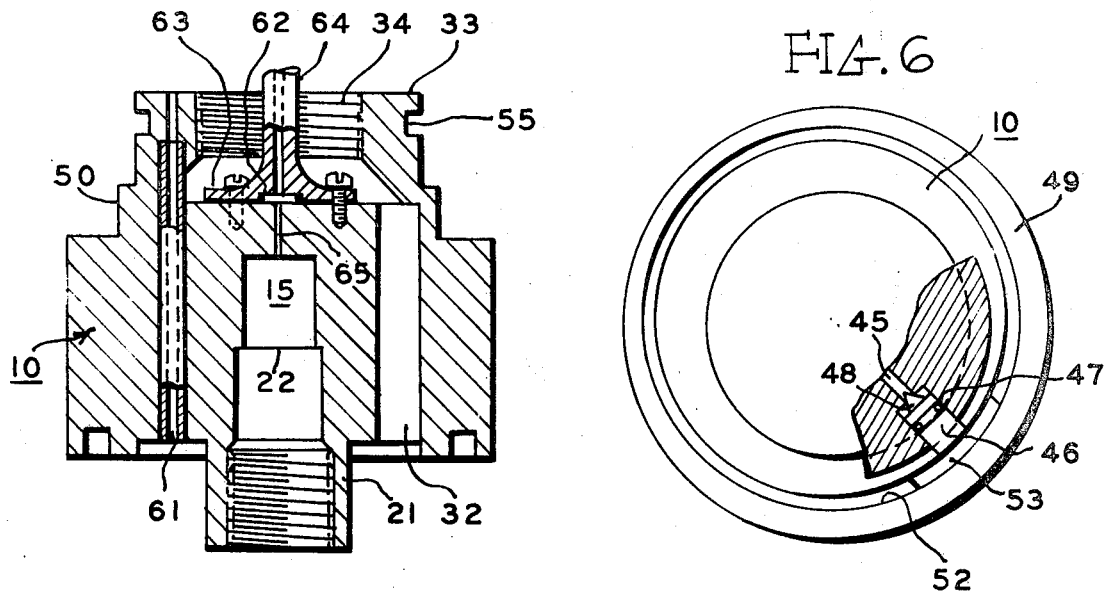
FIG.5
FIG.6
INVENTOR
ALBERT L. SEMON
BY John A. Seifert
ATTORNEY

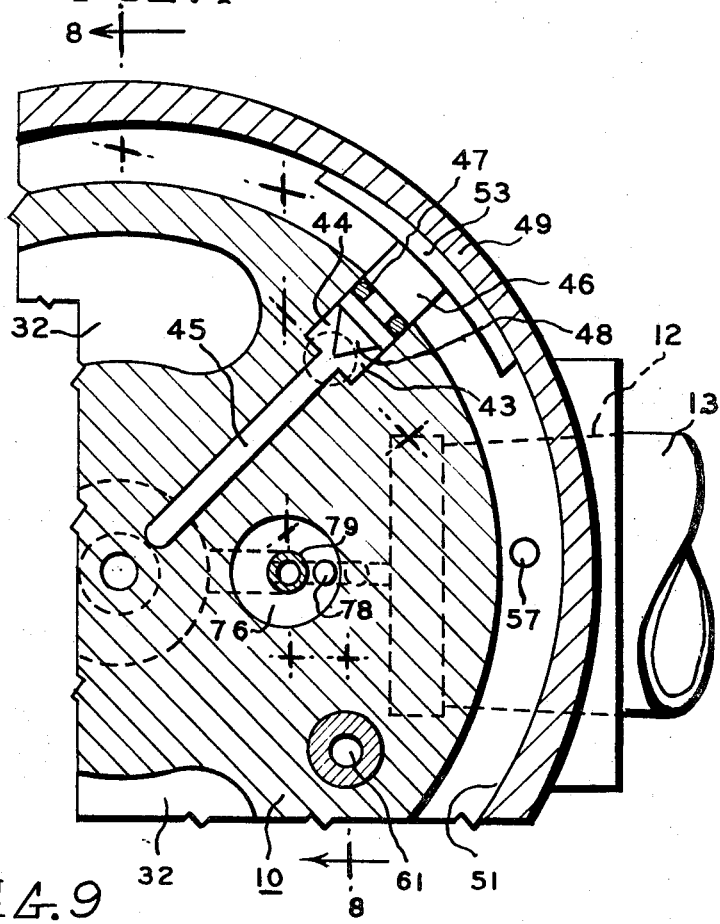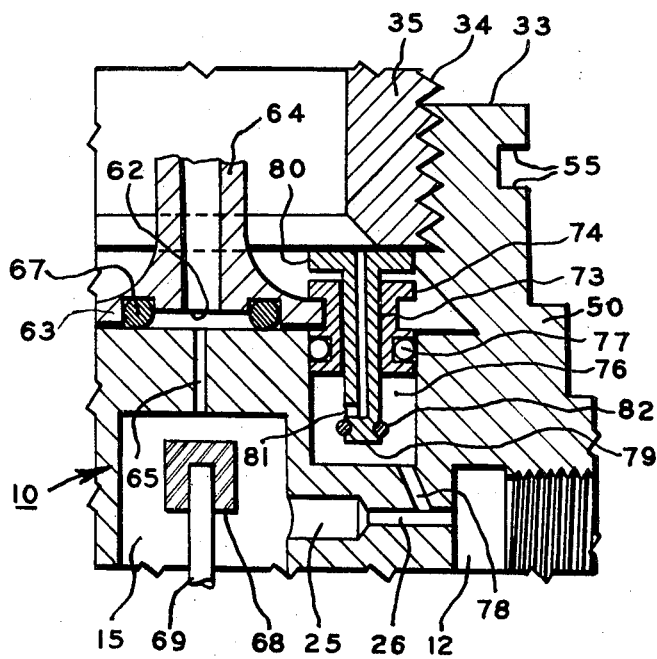

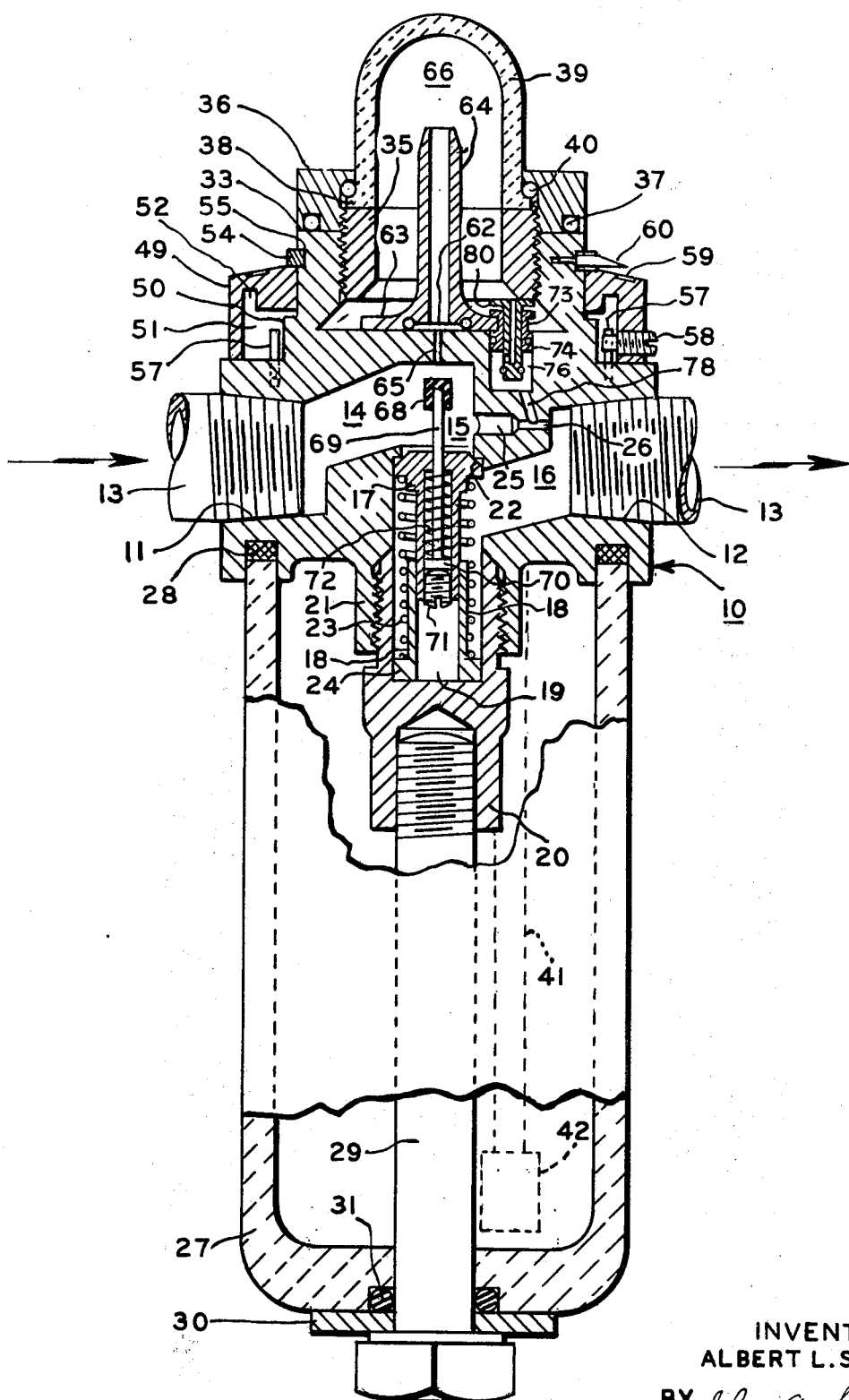

United States Patent Office 3,519,100
Patented July 7, 1970

3,519,100
AIR LINE LUBRICATORS
Albert L. Semon, 11 Eliot Place,
Short Hills, N.J. 07078
Filed Feb. 11, 1966, Ser. No. 526,751
Int. Cl. F16n 7/34
U.S. Cl. 184—55     6 Claims

ABSTRACT OF THE DISCLOSURE

Lubricant is drawn from a reservoir by equalizing air pressure in the air line and the lubricator which permits a flow of air to mix with a predetermined flow of lubricant to form a lubricant mist to be delivered to a venturi passageway which delivers said lubricant mist to an air actuated tool. The flow of air to be mixed with the predetermined flow of lubricant is stopped by the removal of a lubricant filler closure from the lubricator which permits the filling of the reservoir without shutting down the air line.

---

This invention relates to lubricants disposed in an air line connecting a source of air pressure to an air actuated tool whereby said tool is maintained in a lubricated condition, and particularly to miniature lubricators.

It is an object of the invention to provide a lubricator producing a lubricant mist regardless whether the flow of air through the line is two-tenths cubic foot per minute or at full capacity of said line without the forming of drops of liquid lubricant in a lubricant reservoir or a lubricant mist chamber of the lubricator.

It is another object of the invention to provide a lubricator wherein the reservoir can be filled to any point below valve mechanism controlling the flow of lubricant mist to a venturi whereas in previous lubricators where a lubricant mist is desired, the reservoir can only be filled from one-half to two-thirds of the reservoir capacity. In the previous lubricators, the liquid lubricant is dripped into the lubricant reservoir and it is expected that the flow of air through the line will pick up lubricant mist from the drops and in so doing drops of lubricant are also picked up.

It is another object of the invention to produce a miniature lubricator which can be filled without shutting off the air supply.

It is a further object of the invention to produce a miniature lubricator which can be filled with liquid lubricant from a bottle. In all other existing miniature lubricators it is necessary to use an eye-dropper.

A further object of the invention is to provide a lubricator wherein the pressures are equal both in the lubricant reservoir and the lubricant mist chamber whereas in the previous lubricators differential pressures are required for operation.

Further objects and advantages of this invention will be set forth hereinafter.

In the drawings accompanying and forming a part of this application:

FIG. 1 is a top plan view of the lubricator with certain parts in section;

FIG. 2 is a sectional view in elevation taken on the line 2—2 of FIG. 1 looking in the direction of the arrows;

FIG. 3 is a sectional plan view of a head of the lubricator above pipe line connections of said head;

FIG. 4 is a fragmentary sectional view, on an enlarged scale, similar to FIG. 2 of the lubricator head with parts of the head broken away;

FIG. 5 is a sectional view taken on the radial lines 5—5 of FIG. 3 looking in the direction of the arrows.

FIG. 6 is an inverted view partly in section looking in the direction of the arrows from the line 6—6 of FIG. 2;

FIG. 7 is a fragmentary sectional view taken on the line 7—7 of FIG. 4 looking in the direction of the arrows;

FIG. 9 is a sectional view taken on the line 9—9 of FIG. 8 looking in the direction of the arrows; and FIG. 10 is a sectional view in elevation taken on the line 10—10 of FIG. 1 looking in the direction of the arrows.

Figure 8:
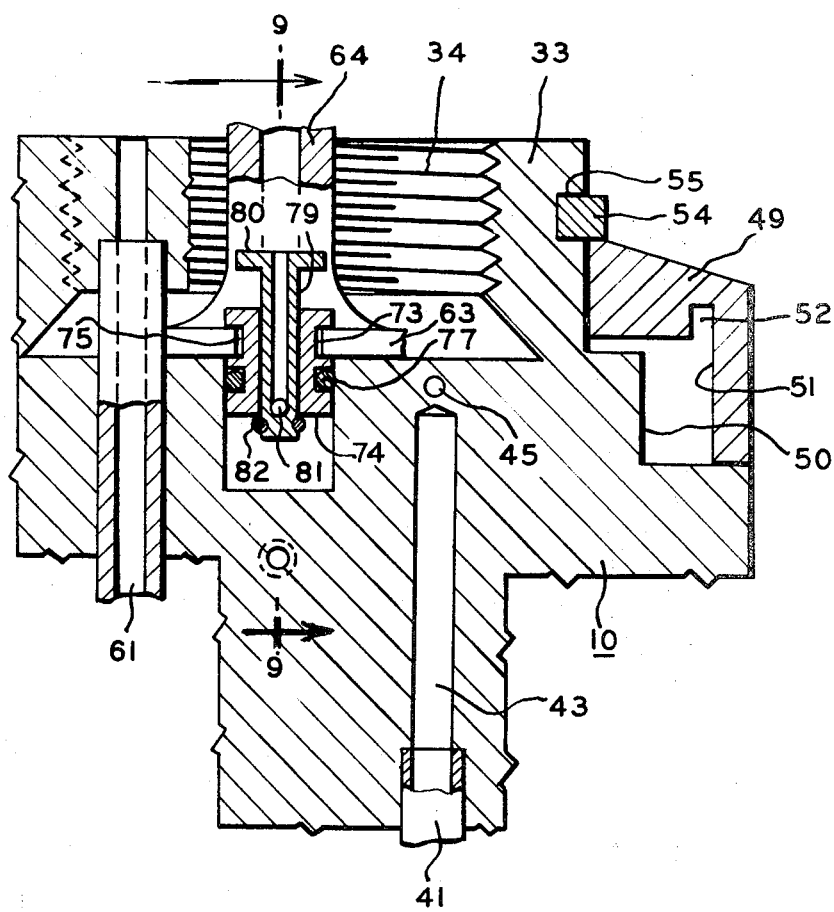
FIG. 8 is a sectional view taken on the irregular line 8—8 of FIG. 7 looking in the direction of the arrows.

The embodiment of the invention illustrated in the accompanying drawings comprises a head 10 arranged with horizontally aligned screw-threaded openings 11 and 12 for connection in an air line 13, as shown in FIGS. 1, 3 and 10. The opening 11 is connected to the portion of the air line 13 leading from a source of air pressure, such as an air compressor, not shown, and the opening 12 is connected to the portion of the air line 13 leading to an air actuated tool, such as a pneumatic hammer, not shown. The opening 11 leads to an inlet passage section 14 extending in an upward oblique direction and terminating in a vertical bore 15 extending through the bottom of the head 10. An air outlet passage section 16 extends from the vertical bore 15 in an oblique plane below the oblique plane of the inlet air passage section 14 and terminates in the opening 12. The air inlet section 14 is normally closed from the air outlet section 16 by a valve 17 slidably mounted in a bearing 18 supported in a recess 19 in a coupling 20 screw-threaded in a boss 21 depended from the bottom of the head 10 circumferentially of the vertical bore 15 with the recess 19 forming a continuation of the vertical bore 15. The valve 17 is provided with an annular tapering face engaging an annular seat at the bottom of the inlet section 14 and at the top of the outlet section 16, as shown at 22 in FIGS. 2, 4, 5 and 10. The valve 17 is normally closed by a spring 23 compressed between the head of the valve and an annular flange 24 at the bottom of the bearing 18. The valve 17 is actuated to open position by the demand of air in the outlet section 16 by the air actuated tool. The valve 17 is normally regulated to open when an excess of two-tenths of a cubic foot per minute of air is required by the tool.

When this excess of air is not required, the air flows from the vertical bore 15 to the discharge end of the outlet section 16 through a venturi passageway consisting of an enlarged bore section 25 communicating with the vertical bore 15 and a reduced diameter section 26 communicating with the discharge end of the outlet section 16, as shown in FIGS. 9 and 10.

A liquid lubricant reservoir is provided comprising a bowl 27 of transparent material, such as plastic, having the open edge engaged in an annular groove in the body 10 circumscribing the boss 21 and arranged with a gasket, as shown at 28 in FIGS. 2 and 10. The open end of the bowl 27 is removably retained in sealing engagement with the gasket 28 by a bolt 29 extended through the bowl 27 with the inner end screw-threaded in the coupling 20 and the head of the bolt abutting a washer 30 to compress an O-ring 31 in a recess in the bottom of the bowl, as shown in FIGS. 2 and 10.

The bowl 27 is filled with liquid lubricant or lubricating oil through openings 32 extending through the head 10 with the filler ends of said openings terminating within an annular flange 33, as shown in FIG. 5, extended from the top of the head 10 with a cylindrical portion of the flange internally screw-threaded, as at 34, for the mounting of a straight wall ring 35 attached to a ring 36 having the lower end abutting the top of the flange 33 and sealed by an annular gasket 37. The upper end of the ring 36 is flanged and extended over an annular flange 38 at the bottom of a dome-shaped filler closure 39 and sealed by an annular gasket 40, as shown in FIGS. 2 and 10. The filler closure 39 is removed from the head 10 by unscrewing the ring 35 which also removes the ring 36 by a suitable tool engaged on flats 83. The filler closure 39 is of transparent material, such as plastic.

The bowl 27 is filled with liquid lubricant or lubricating oil while the head 10 is secured in the air line 13 without shutting-off the air supply and this is accomplished by providing a vent passage 61 extended through the head 10 and the flange 33 from the bottom portion of said head exposed to the interior of the bowl 27 to the top of the flange 33 exposed to the atmosphere, as shown in FIGS. 5 and 8. Therefore, the passage 61 permits the escape of air from the bowl 27 to the atmosphere.

The liquid lubricant or lubricating oil is withdrawn from the bowl 27 through a tube 41 having a filter 42 at the intake end thereof and the discharge end thereof mounted in an enlarged bore portion of a lubricant or oil passage 43 extending in the head 10 to a valve chamber 44 communicating with a transverse lubricant or oil passage 45 leading into the cavity formed by the annular flange 33. The flow of lubricant into the passage 45 is controlled by a valve comprising a cylindrical body 46 slidable in the valve chamber 44 and sealed in said chamber by an O-ring 47. One end of the cylindrical body 46 is provided with a pointed portion 48 to be adjusted into and out of the entrance of the passage 45 by an eccentric ring 49 rotatably mounted on a circumferential stepped portion 50 of the head 10 and the flange 33. The inner circumference of the ring 49 is provided with a recess 51 having a groove 52 for the sliding engagement of a flange 53 extended from the end of the valve body 46 opposite the end provided with the pointed portion 48. The eccentric ring 49 is retained on the stepped portion 50 and the flange 33 by a split ring 54 engaged in a groove 55 in the flange 33 and extended over the top of the eccentric ring 49, as shown in FIGS. 1, 2, 4, 8 and 10. When the outer face of the valve flange 53 is juxtaposed to the inner face of the thinnest portion of the eccentric ring 49, the passage 45 is fully opened and when the outer face of the flange 53 is juxtaposed to the inner face of the thickest portion of the eccentric ring 49, the passage 45 is closed. The rotation of the eccentric ring 49 is limited by the inner face of the thickest portion of said eccentric ring contacting pins 57 secured in the lower step of the stepped portion 50. The eccentric ring 49 is retained in adjusted position by a set-screw 58 threaded in said eccentric ring to abut the riser of the stepped portion 50. The adjusted positions of the valve 46 is indicated by indica 59 on top of the eccentric ring 49 positioned relative to a pointer 60 extended from the side of the flange 33 and between the split ends of the retaining ring 54.

The lubricant delivered by the passage 45 is transformed into a lubricant mist by providing a recess 62 in a base 63 of a nozzle 64, said base being secured to the top of the head 10 within the flange 33 with the nozzle terminating in the filler closure 39. The lubricant is discharged from the passage 45 into the recess 62 to be mixed with air flowing from the inlet portion 14 and the vertical bore 15 of the air passage in the head 10 into the recess 62 through an air port 65 extended through the top of the head 10 in alignment with the bore of the nozzle 64 and delivering air to the recess 62 to form a lubricant mist. The resulting lubricant mist is delivered by the nozzle to the filler closure 39 which forms a lubricant mist chamber 66. The base 63 is sealed by an O-ring engaged in a groove encircling the recess 62, as shown at 67 in FIGS. 4 and 9.

The flow of air through the port 65 is controlled by a valve 68 having a stem 69 slidably mounted in the head of the valve 17 and having a flange slidable in an elongated recess 70 in the stem of said valve 17, as shown at 70 in FIGS. 2 and 4. The opening movement of the valve 68 is limited by the valve stem flange abutting a plug 71 threaded in the bore of the stem of the valve 17. The valve 68 is yieldingly urged to open position by a spring 72 compressed on the stem 69 between the flange 70 and the end of the recess in the stem of the valve 17. The valve 68 is in open position when the closure 39 is mounted on the head 10, as hereinafter described so that there will be lubricant mist in the chamber 66 during the time there is a flow of air in the line 13.

The lubricant in the chamber 66 is delivered to the air stream in the outlet section 16 by the flow of air in the venturi passageway 25, 26. This is accomplished by valve mechanism comprising a bearing member 73 having flanges 74 at the opposite ends with one end portion of the bearing member 73 engaged in a recess 75 in the spout flange 63 and the adjacent flange 74 resting on said spout flange, as shown in FIGS. 8 and 9. The opposite flange 74 is positioned in a communication chamber 76 in the head 10 with an O-ring 77 engaged in an annular groove adjacent to said opposite flange 74 to seal the communication chamber 76 from the lubricant mist chamber 66. The communication chamber 76 communicates with the smaller venturi passageway section 26 through a port 78. A tubular valve stem 79 is slidable in the bearing 73 with a flange 80 at one end of the stem 79 extended above the flange 74 resting on the spout flange 63. The opposite end of the valve stem 79 is closed and provided with a port 81 in the side wall communicating with the bore of the valve stem 79. When the filler closure 39 is initially replaced on the head flange 33 after the bowl 27 is filled with lubricant, the straight ring 35 will abut the valve flange 80 and move the valve stem 79 into the communication chamber 76 and position the port 81 in communication with said chamber 76 whereby the air will flow from the air passage 14, 15, 25, 26 to the lubricant mist chamber 66 and through the spout 64, the recess 62 and the port 65 which will move the valve 68 from the port 65 under the influence of the spring 72. After the initial opening of the valve mechanism 79–81, the air flowing through the port 65 will mix with the lubricant being discharged into the spout recess 62 to form a lubricant mist which will flow through the spout 64 into the lubricant mist chamber 66 and through the valve mechanism 79–81 into the chamber 76 through the port 78 and the venturi passageway section 26 into the section of the air line 13 connected to the air actuated tool to lubricate said tool.

When it is necessary to replenish the bowl 27 with lubricant, the filler closure 39 is removed from the head flange 33 by unscrewing the rings 35 and 36. The removal of the rings 35 and 36 will permit the valve mechanism 79–81 to move upwardly under the force of the air in the air passage 14, 15, 25, 26 and said upward movement of said valve mechanism 79–81 will close the port 81 and prevent the escape of air from the head 10 through the valve mechanism 79–81. The valve stem 79 is provided with an O-ring 82 below the port 81 to engage the lower bearing flange 74, as shown in FIG. 8, whereby the valve stem 79 is sealed. Simultaneously the pressure in the air passage sections 14 and 15 will move the valve 68 against the influence of the spring 72 to close the air port 65, whereby the head 10 is completely sealed and the flow of air is uninterrupted through the line 13 and the air passage 14, 15, 25, 26.

Having thus described my invention, I claim:

1. In an air line lubricator, a head having an air passage adapted to be connected at the opposite ends to a source of air passage and air actuated tools, a first valve dividing said air passage into an inlet section and an outlet section, said valve being yieldingly urged to close said sections from each other and actuated to open position proportional to air supply demand of the air actuated tools in the outlet section of the air passage, a venturi air passageway in the head extending from the inlet section to the outlet section of the air passage and by-passing said first valve, a lubricant reservoir suspended from the head, a filler closure removably mounted on the head in opposed relation to the lubricant reservoir and forming a lubricant mist chamber, the head having openings extended from said lubricant mist chamber to the lubricant reservoir for filling the reservoir by removal of the filler closure, a nozzle extended into the lubricant mist chamber and having air communication with the inlet section of the air passage in the head, a second valve slidably supported in the first valve and controlling the flow of air from the inlet section of the air passage to the lubricant mist chamber, lubricant passages in the head having an inlet communicating with the lubricant in the reservoir and an outlet communicating with the air communication between the nozzle and the inlet section of the air passage to atomize the lubricant and deliver a lubricant mist to the lubricant mist chamber, and valve mechanism slidably supported in the head for delivering said lubricant mist from the lubricant mist chamber to the venturi passageway.

2. In an air line lubricator according to claim 1, a third valve interposed in the lubricant passages in the head, and means connected to said third valve and manipulated exteriorly of the head to adjust the third valve to desired lubricant flow control positions, said adjusting means for the third valve comprising an eccentric ring rotatably mounted on the exterior of the head and having a groove adjacent to the inner eccentric wall surface, and the third valve being provided with a flange riding in said groove.

3. In an air line lubricator as claimed in claim 2, stops spaced apart on the exterior of the head to contact the thickest portion of the eccentric ring and limit the rotation of said ring in either direction.

4. An air line lubricator as claimed in claim 1, wherein the head is provided with a communication chamber sealed from the lubricant mist chamber and communicating with the venturi air passageway, and the valve mechanism for delivering the lubricant mist from the lubricant mist chamber to the venturi air passageway is mounted in said communication chamber.

5. An air line lubricator as claimed in claim 4, wherein the valve mechanism for delivering the lubricant mist from the lubricant mist chamber to the venturi air passageway comprises a bearing mounted in the portion of the communication chamber sealed from the lubricant mist chamber, a tubular valve stem slidable in the bearing and having one end closed with the closed end provided with a lateral port and the opposite end of the valve stem provided with an annular flange adapted to be engaged by the filler closure, said engagement positioning the valve stem with the port opening to the communication chamber for the passage of lubricant mist from the lubricant mist chamber to the communication chamber and the venturi air passageway, and the removal of the filler closure permitting the valve stem to move to position closing the port by the bearing to prevent escape of air from the air passage in the head.

6. In an air line lubricator as claimed in claim 1, a spring urging the second valve to open air communication between the inlet section of the air passage in the head and the lubricant mist chamber and said second valve is actuated to close said air communication against the force of said spring by the air pressure in the air passage in the head when the filler closure is removed from the head.

References Cited
UNITED STATES PATENTS

| | | | |
|---|---|---|---|
| 2,296,135 | 9/1942 | Batson et al. | 137—533.13 |
| 3,023,849 | 3/1962 | Tine | 261—78.1 X |
| 2,698,065 | 12/1954 | Streicker et al. | |
| 2,762,457 | 9/1956 | Andresen et al. | |
| 2,835,267 | 5/1958 | Andresen et al. | |
| 3,064,760 | 11/1962 | Shada. | |
| 3,244,257 | 4/1966 | German et al. | |

LAVERNE D. GEIGER, Primary Examiner

E. J. EARLS, Assistant Examiner

U.S. Cl. X.R.

239—338; 261—78